Aug. 29, 1967 G. F. LYMAN 3,338,421

TAPE REEL RACK

Filed July 13, 1965

2 Sheets-Sheet 1

INVENTOR
GEORGE F. LYMAN

BY,
Wolf, Greenfield & Hieken
ATTORNEYS

INVENTOR
GEORGE F. LYMAN
BY, Wolf, Greenfield & Hieken
ATTORNEYS

United States Patent Office 3,338,421
Patented Aug. 29, 1967

3,338,421
TAPE REEL RACK

George F. Lyman, South Hadley, Mass., assignor to Data Packaging Corp., Cambridge, Mass., a corporation of Massachusetts Filed July 13, 1965, Ser. No. 471,529
8 Claims. (Cl. 211—41)

This invention relates to devices for storing tape and film reels and more particularly comprises a new and improved rack particularly designed to store enclosed reels.

The storage of computer tape wound on reels in the data processing field has become a major concern to those in the industry because of the growing number of tapes that they are called upon to retain. Recently specially designed storage cabinets have appeared on the market which are designed to store the loaded reels in a compact manner so as to provide maximum storage capacity in a given volume. However, these cabinets are expensive, and many require specially designed cases for the reels.

One important object of this invention is to provide a rack for reels, which stores the reels efficiently and which may be used to stack reels in conventional storage cabinets.

Another important object of this invention is to provide a rack for a limited number of reels, which may conveniently be carried from place to place. Such a rack may be removed from a storage cabinet and be placed on a shelf or table so as to present its reels at a more convenient location for the use of the operator.

Another important object of this invention is to provide a rack for reels, which normally retains the reels in a rearward position but, which enables the reels to be moved to a forward position out of line with the other reels on the rack in a conspicuous location particularly convenient for ready removal by an operator.

Still another important object of this invention is to provide a reel rack whose depth is substantially the same as the diameter of the reels to be stored on it so that it does not take up or require a deeper shelf or storage compartment for support than would be required for the reels without the use of the rack.

To accomplish these and other objects the reel rack of this invention includes among its features a rear and bottom wall and a short front wall. A plurality of partitions are secured to at least one of the walls and define with them a number of reel pockets for supporting the reels standing on edge. Means are provided in each of the pockets for selectively holding each reel on edge in either a rear or a forward position. The depth of the rack is such that the forward edge does not extend substantially forward of the periphery of the reels in the rear position in the pockets.

These and other objects and features of this invention along with its incident advantages will be better understood and appreciated from the following detailed description of one embodiment thereof, selected for purposes of illustration and shown in the accompanying drawing, in which.

Figures 1, 2:
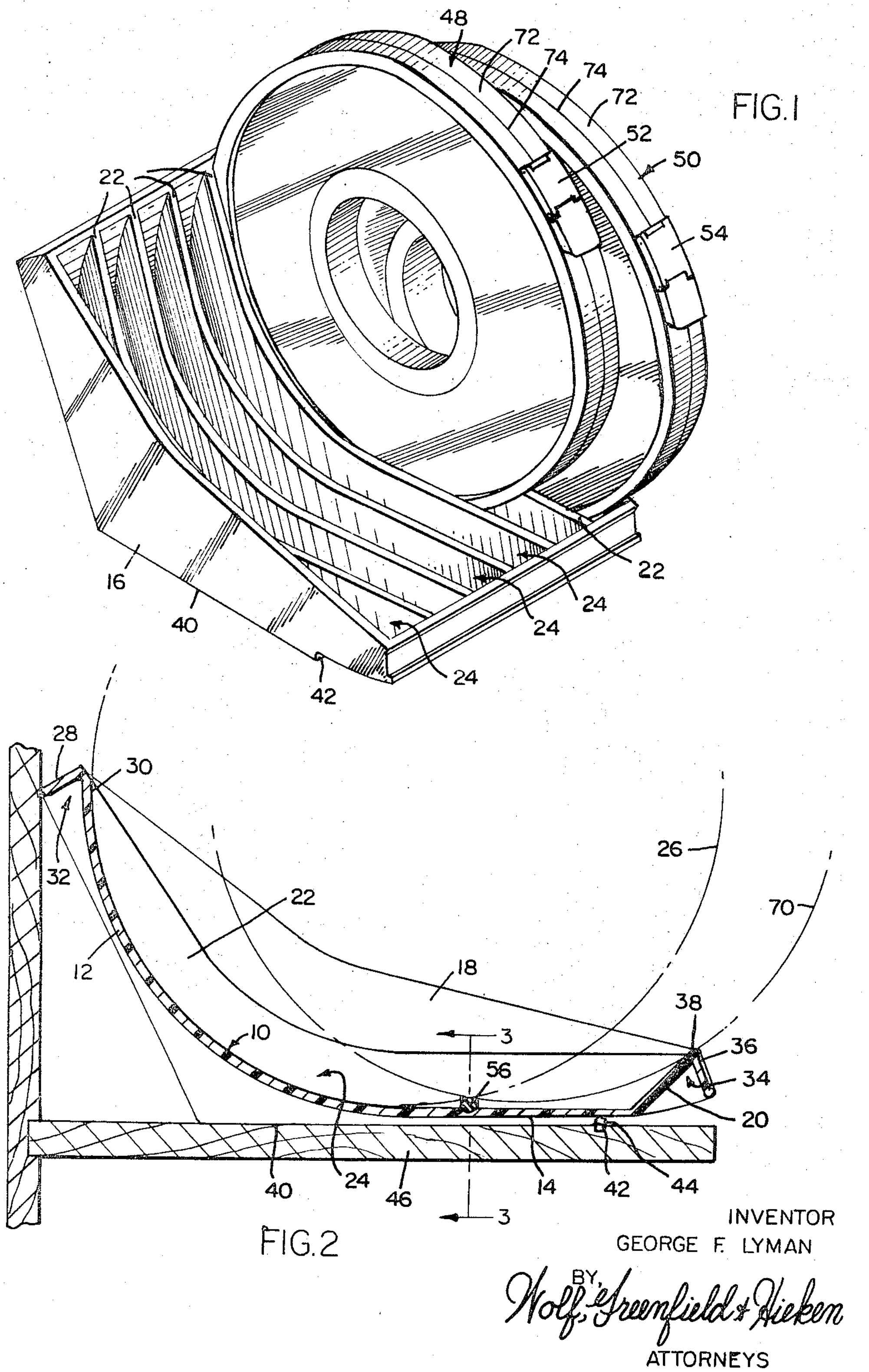
FIG. 1 is a perspective view of a reel rack constructed in accordance with this invention and shown supporting two reels, one in the normal rearward position and the other in the forward position.
FIG. 2 is a cross-sectional view of the reel rack shown supported on a cabinet shelf and with the two positions of the reel suggested in broken lines.

The reel rack shown in the drawing includes an arcuate panel 10 that defines a rear wall 12 and a bottom wall 14, a pair of side panels 16 and 18, a short upwardly and forwardly inclined front wall 20 and a number of partitions 22 that divide the rack into a plurality of reel pockets 24. In the form shown five partitions are used to provide six pockets in the rack. The components of the rack may all be molded as an integral unit from styrene or some similar plastic material.

The rear wall 12 defined by the arcuate portion of the panel 10 is of substantially the same radius as the closure for the reel case designed to be stored in the rack. This is suggested in FIG. 2 by the broken line 26 which suggests the outline of the enclosed reel disposed in the rear position in the pocket 24. A lip 28 extends rearwardly and downwardly from the top edge 30 of the rear wall 12 and defines a finger grip 32. A similar finger grip 34 is defined by a lip or flange 36 that extends downwardly from the top edge 38 of the front wall 20 of the rack. The finger grips 32 and 34 enable an individual to easily carry the rack even when loaded with reels by providing convenient handles at the front and back so that the rack is balanced between the hands of the carrier. It will also be noted in FIG. 2 that a shallow recess is provided on the front face of the flange 36. Labels or other indicia may be secured to the face if desired to identify the contents of the reels on the rack.

The side panels 16 extend downwardly below the plane of the bottom wall 14 and the lower horizontal edge 40 of each side panel forms a leg for the rack. A shoulder or notch 42 is provided adjacent the front of the lower edge 40 and forms a stop to cooperate with a rib or similar protuberance 44 provided on the shelf on which the rack is placed to prevent the rack from accidentally sliding forward off the shelf particularly when a reel is being drawn from the rack. This relationship is shown in FIG. 2, wherein the rib or protuberance 44 is shown on the upper surface of the shelf 46 of the cabinet. It will be recognized from an inspection of that figure that the rack cannot accidentally be pulled forward because the shoulder 42 abuts against the rear side of the rib 44.

In FIGS. 1 and 2 and in the preceding description it has been suggested that each of the pockets 24 provided in the rack is designed to support the reels (with or without their closures) in one of two positions selected by the operator. While in the drawings the reels are shown covered by a closure, it is to be understood that the rack may be used with exposed reels or with reels enclosed in other forms of cases, with perhaps some dimensional changes. In FIG. 1 the reel and closure 48 is shown in the normal or rearward position while the reel and closure 50 is shown in the forward position. It will be appreciated that the reel and closure 50 may readily be lifted from the rack by grasping the sides of the reel and closure because the assembly extends forwardly of the reel and closure 48 as well as other reels and closures on the rack and on adjacent racks (not shown) which are in their rearward or normal position. To move a reel and closure from the normal position to the forward position it is only necessary to roll them in their pocket. This is also suggested by the relative positions of the latching devices 52 and 54 of the two reels and closures 48 and 50, respectively. Once rolled forward to the position of reel and closure 50 of FIG. 1, the reel and closure remains in that position until it is purposely moved rearwardly to the normal position. The reels and closures are held in either one of the two positions by a rod 56 having a rubber-like coating 58. The coating on the rod is provided to prevent the reels from turning in place when an operator attempts to roll them over the rod from one to the other of the two positions for the reels and closures.

Figure 5:
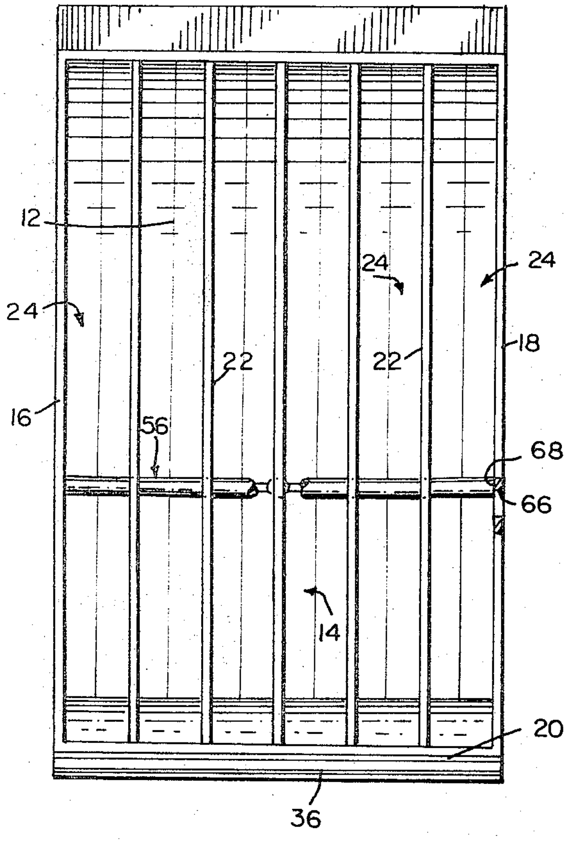
FIG. 5 is a top view of the reel rack.

The rod 56 extends across the bottom wall 14 of the rack through a series of aligned holes 60 at the bottom of each partition 22. Because the inner surface 62 of each pocket 24 is not flat (for purposes which will be explained presently) the openings 60 in the bottom of each partition are aligned with shallow troughs 64 in the surfaces 62 so that the rod 56 may lie flat on the bottom of each pocket. In order to insert the rod 56 in place, the side panel 18 is provided with an opening 66 of substantially the same size as the openings 60 but slightly out of alignment with these openings. The opening 66 in the side panel 18 allows the rod 56 to be inserted in place along the bottom wall 14, and when the end 68 of the rod clears the opening 66, the rod 56 straightens and assumes the position shown in FIG. 5. Because the opening 66 is not aligned with the other openings, the rod 56 will not slip from its position in the rack. It will be noted in FIG. 5 that each of the ends of the rod abut against the inner surface of the adjacent side panel, and the rod is permanently in place.

In FIG. 2 the broken line 70 suggests the outline of the reel and closure in the forward position in the pocket 24. It will be noted that when the reel and closure assembly is in the forward position suggested by the broken line, the center of the reel lies forward of the rod 56 so that the reel and closure assembly will not of itself roll rearwardly to the position suggested by broken line 26. Rather, to move the reel and closure from one to the other position it is necessary for the operator to either lift the reel and closure over the rod from one location to the other or roll the reel and closure over the rod. As suggested above, the rubber-like coating on the rod 56 allows the reel and closure to be rolled easily over it.

The closures shown about the reels in FIG. 1 are of the wrap-around variety particularly designed for use with solid flange reels. A typical example of such a wrap-around closure is shown in copending application Ser. No. 307,859 filed Sept. 10, 1963 in the name of Mathus et al. For convenience in molding such wrap-around closures the outer face 72 of the wrap-around is often provided with a slight bevel which forms a ridge 74 and sloping side faces to the side edges. To provide a stable support for reels in such closures the lower surfaces 62 of each pocket 24 are provided with a contour which mates with the bevel of the outer face 72. The matching contours of the surface 62 and the outer face 72 of the closures tend to stabilize the reels and closures in the pockets. It will be appreciated that if the outer surface of the closure is provided with the contours suggested and the lower surface of each pocket is flat, the reels and closures will have a tendency to rock from side to side unless the closures fit very tightly between the partitions 22. It is not desirable that the reels and closures fit very tightly between the partitions for such a fit will make it difficult to insert the reels and closures in the pockets and roll them from one position to another. Consequently, it is desirable that the supporting surfaces of the pockets have a trough-shaped contour to provide for reel closures which are not flat on their outer surface.

Figure 3:
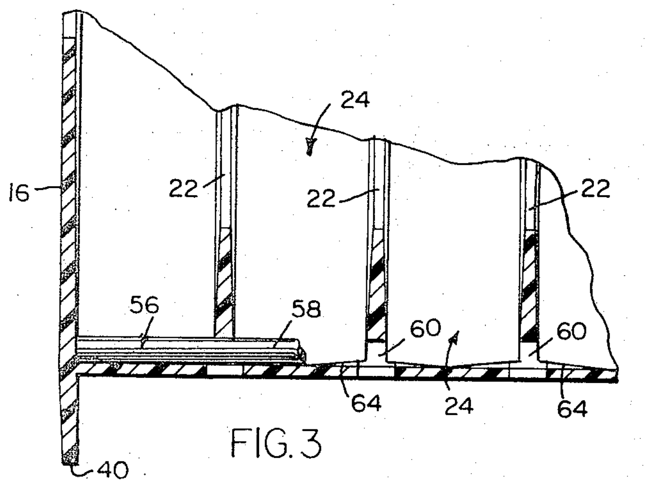
FIG. 3 is a cross-sectional view taken along the section line 3—3 of FIG. 2.
Figure 4:
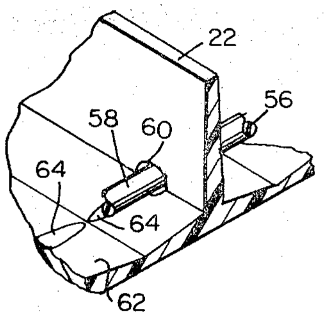
FIG. 4 is a fragmentary perspective view of a detail of the reel rack.

In order to facilitate the insertion and removal of the reels and closures into the pockets, the inner surfaces of the side panels 16 and 18 as well as the surfaces of the partitions 22 are each provided with a slight draft of approximately 1½° so that each pocket is wider at the top than at the bottom. In FIG. 3 the inner face of panel 16 is shown to form a slight angle with the vertical as do each of the faces of the partitions 22.

It is of course, preferable that the rack store the reels and closures as compactly as possible so as to provide the maximum storage capacity in a given volume. Therefore, it is desirable that the end panels 16 and the partitions 22 be relatively thin in the range of .09 to .10 inch in thickness. To best utilize storage space it is also desirable that the over all depth of the rack not exceed by a significant amount the diameter of the reels and closures stored in them so that the rack does not add appreciably to the depth of the storage space required by reels mounted on their ends directly on a shelf without any support. This feature is embodied in the present invention as is clearly shown in FIG. 2. It will be noted in that figure that the forwardmost point on the periphery of the reel and closure suggested by broken line 26 lies almost directly above the front edge of the rack. The rear of the rack extends a very short distance rearwardly of the periphery of the reel and closure represented by the broken line 26 so that the total depth of the rack is substantially that of the reel and closure and the front and rear edges are aligned with the extremes of the closure periphery when the reel is disposed in its normal position on the rack. If the partitions and panels are kept at minimum dimensions, the over all width of the rack is substantially that of the combined width of the number of reels and closures designed to be stored in it.

From the foregoing description those skilled in the art will appreciate that the rack of the present invention fulfills the many objects recited in the introduction. It may be used in any cabinet large enough to receive the reels themselves, and no special cabinet design is required. The rack is particularly convenient for an operator as it allows him to segregate certain reels and closures from others on the rack by merely rolling them forward to the position of the reel and closure 50 shown in FIG. 1. Consequently, at the beginning of a program the operator may move to the forward position those reels and closures which are to be used during the operation so that when each is required it may very easily be taken from the rack without hunting for it. That is, the operator may first locate and move forward each of the reels to be used, and the continuity of work thereafter is not interrupted by the need for seeking out the next or other reels to be used.

It will also be appreciated that the racks may be used side by side in rows so that any number of reels may be stored depending only upon the length of shelf space provided. The operator may conveniently remove a rack from the shelf merely by slipping his fingers of one hand under the lip or flange 36 and lift it slightly to clear the rib 44 and pull the rack forward until the rear lip 28 is accessible to the other hand. It will be noted that the bottom of the front lip 36 is elevated so that there is room to insert the fingers beneath the lower edge into the finger grip 34 even when the grip 34 is disposed over the supporting shelf.

It will be apparent to those skilled in the art that numerous modifications may be made of this invention without departing from its spirit. Therefore, it is not intended to limit the breadth of this invention to the single embodiment illustrated and described. Rather, it is intended that the scope of this invention be determined by the appended claims and their equivalents.

What is claimed is:

1. A reel rack comprising,
an arcuate plate defining rear and bottom walls, the rear portion of the arcuate plate having substantially the curvature of reel assemblies adapted to be held in the rack,
a pair of vertical side panels secured to the side edges of the arcuate plate,
a plurality of vertical partitions parallel to the side panels and spaced apart to define with the panels pockets each sized to receive a reel assembly,
rod members having a skid resistant surface secured to the upper surface of the portion of the arcuate plate defining the bottom wall, said rod members being provided for holding each reel assembly in a rear position in the rear portion of the pocket when the center of a reel assembly lies rearwardly of the member and for holding a reel assembly in a front position in the front portion of the pocket when the center of the reel assembly lies forward of the member, and hand grips provided at opposite ends of the arcuate plate for carrying the rack when its pockets are loaded with reel asemblies.

2. A reel rack as defined in claim 1 further characterized by said side panels extending below the bottom of the arcuate plate and with the bottom edges of the panels forming legs of the rack, and a shoulder provided on the bottom edge of each panel for forming a stop to bear against a rib in a shelf for supporting the rack.

3. A reel rack as defined in claim 1 further characterized by the front edge of the rack not extending appreciably forward of the periphery of a reel assembly in the rear position in a pocket.

4. A reel rack as defined in claim 1 further characterized by aligned openings in each of the partitions and an opening in one of the end panels immediately above the plane of the bottom wall, said rod members comprising a single rod extending through the openings in the partitions, said opening in the end panel being slightly out of alignment with the other openings enabling the rod to be inserted through said other opening and preventing the rod from falling out of that opening when it is in place on the bottom wall.

5. A reel rack comprising a rear and a bottom wall, and a front wall substantially shorter than said rear wall, said rear wall being arcuate in shape and substantially conforming to the radius of a reel assembly for bearing against the periphery of a reel, when the reel assembly is in its rearward position, a plurality of partitions secured to at least one of the walls and defining with the walls a number of reel pockets for holding reel assemblies standing on edge, means provided in each of the pockets for selectively holding each reel assembly on edge in a rear or a forward position, and hand grips provided on the rear and front walls for carrying the rack.

6. A reel rack as defined in claim 5 further characterized by said rear and bottom walls within each pocket being trough-shaped in cross section to provide a base for the peripheries of reel assemblies.

7. A reel rack comprising a rear and a bottom wall, and a front wall substantially shorter than said rear wall, a plurality of partitions secured to at least one of the walls and defining with the walls a number of reel pockets for holding the reel assemblies standing on edge, means provided in each of the pockets for selectively holding each reel assembly on edge in a rear or a forward position, said means comprising a rod having a rubber-like surface lying on the bottom wall enabling a reel assembly to be rolled over it from one position to another, said surface preventing the reel assembly from spinning in position when an operator attempts to roll a reel assembly between said positions, said rod being positioned by a plurality of aligned openings defined by said partitions, and hand grips provided on the front and rear walls for carrying the rack.

8. A reel rack as defined in claim 7 and further comprising two side walls with one of said side walls defining a rod receiving opening slightly out of alignment with said openings defined by said partitions.

References Cited

UNITED STATES PATENTS

| | | | |
|---|---|---|---|
| 1,376,703 | 5/1921 | Kimmel | 312—10 |
| 2,281,845 | 5/1942 | Kaplan | 211—40 |
| 2,587,269 | 2/1952 | Yerkes | 312—10 |
| 2,813,633 | 11/1957 | Welling | 211—41 |
| 2,917,179 | 12/1959 | Casey et al. | 211—40 |
| 3,051,537 | 8/1962 | Diehl et al. | 312—20 |

FOREIGN PATENTS

| | | |
|---|---|---|
| 899,466 | 6/1962 | Great Britain. |

ROY D. FRAZIER, *Primary Examiner.*

CLAUDE A. LE ROY, *Examiner.*

W. D. LOULAN, *Assistant Examiner.*